United States Patent
Wang et al.

(10) Patent No.: US 9,412,335 B2
(45) Date of Patent: Aug. 9, 2016

(54) COLOR CALIBRATION AND COMPENSATION FOR 3D DISPLAY SYSTEMS

(75) Inventors: Zhe Wang, Plainsboro, NJ (US); Jiefu Zhai, Cupertino, CA (US); Tao Zhang, Sunnyvale, CA (US)

(73) Assignee: Thomson Licensing, Issy les Moulineaux (FR)

( * ) Notice: Subject to any disclaimer, the term of this patent is extended or adjusted under 35 U.S.C. 154(b) by 321 days.

(21) Appl. No.: 13/816,522

(22) PCT Filed: Aug. 19, 2010

(86) PCT No.: PCT/US2010/002304
§ 371 (c)(1),
(2), (4) Date: Feb. 12, 2013

(87) PCT Pub. No.: WO2012/023922
PCT Pub. Date: Feb. 23, 2012

(65) Prior Publication Data
US 2013/0141432 A1      Jun. 6, 2013

(51) Int. Cl.
*G09G 5/06* (2006.01)
*G09G 3/00* (2006.01)
*H04N 13/04* (2006.01)

(52) U.S. Cl.
CPC .................. *G09G 5/06* (2013.01); *G09G 3/003* (2013.01); *H04N 13/0422* (2013.01); *H04N 13/0425* (2013.01); *H04N 13/0429* (2013.01); *G09G 2320/0209* (2013.01); *G09G 2320/0606* (2013.01); *G09G 2320/0666* (2013.01); *G09G2320/0686* (2013.01); *G09G 2320/0693* (2013.01)

(58) Field of Classification Search
CPC .................................. G06F 3/14; G06F 3/011
See application file for complete search history.

(56) References Cited

U.S. PATENT DOCUMENTS

| 7,102,648 B1 | 9/2006 | Holub |
| 2003/0234796 A1* | 12/2003 | Bakhmutsky ................. 345/606 |
| 2008/0158672 A1 | 7/2008 | McCosky |
| 2009/0167782 A1 | 7/2009 | Petljanski et al. |
| 2010/0208044 A1* | 8/2010 | Robinson ........... H04N 13/0497 348/53 |

FOREIGN PATENT DOCUMENTS

| WO | WO0197531 | 12/2001 |
| WO | WO2007067493 | 6/2007 |

OTHER PUBLICATIONS

Tom Wijsman, "How to calibrate monitor colors to use 3D glasses", Mar. 15, 2010. p. 1. http://superuser.com/questions/120288/how-to-calibrate-monitor-colors-to-use-3d-glasses.*
Iondrive, "Anaglyph calibration test image Anybody got one?", Aug. 6, 2009. p. 1. https://forums.geforce.com/default/topic/415318/anaglyph-calibration-test-image-anybody-got-one-/.*
Search Rept:Jun. 6, 2011.

\* cited by examiner

*Primary Examiner* — Xiao Wu
*Assistant Examiner* — Chong Wu
(74) *Attorney, Agent, or Firm* — Brian J. Dorini; Jerome G. Schaefer (57) ABSTRACT

A method and system for calibration and compensation of color in a three dimensional display system includes user calibration of individual color channels using a multiplicity of grey screens while viewing with three dimensional glasses. Look-up tables are generated to ease conversion of input pixels to color corrected pixels to pre-distort the color of the pixels being driven by the three dimensional display system. Input pixels are then converted using the look-up tables and color corrected frames are displayed to a user. The pre-distortion effect allows a user to perceive colors in the three dimensional system as intended with the distortions caused by the viewing glasses and other aspects of the three dimensional display system.

14 Claims, 5 Drawing Sheets

COLOR CALIBRATION AND COMPENSATION FOR 3D DISPLAY SYSTEMS

This application claims the benefit, under 35 U.S.C. §365 of International Application PCT/US2010/002304, filed Aug. 19, 2010, which was published in accordance with PCT Article 21(2) on Feb. 23, 2012 in English.

FIELD

The present invention relates three dimensional (3D) display systems, and in particular, is related to color compensation for 3D displays with shutter/polarized glasses.

BACKGROUND

Three dimensional (3D) displays have become very popular in consumer electronics market in recent years. Most 3D displays in the market come with a pair of shutter glasses which end users or consumers wear to view the 3D program. The shutter glasses are able to synchronize with a 3D projection, such as from a 3D television (TV), to separate left and right views for the consumer's eyes so as to generate a "3D" viewing experience. Some 3D TVs use polarized glasses, which also act to separate left and right eye views for an end user, although polarized glasses work in a different manner.

In principle, 3D display systems should not distort the colors of the original content. The end users or consumers at home or in a theater should see exactly the same color as colorists (or artists) can see in the post-production house. However, this fidelity is not achieved for current 3D display systems.

Figure 1:
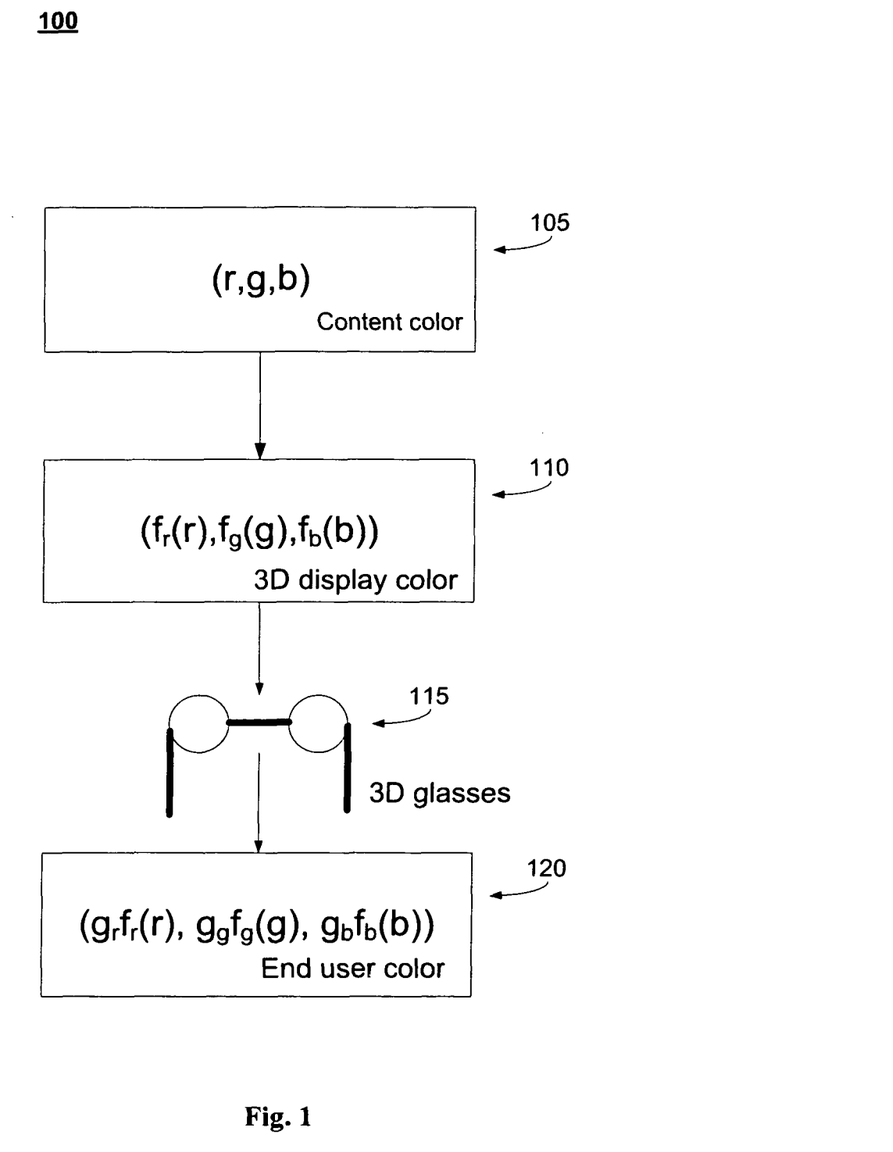
FIG. 1 illustrates color distortion in a prior art 3D system.

FIG. 1 illustrates the effects of various components in a current 3D system 100. FIG. 1 provides a representation of color shifting or color distortion caused by 3D systems employing 3D glasses. The color seen by the end user is different than that of the original post production content color. Post-production content 105 is shown having red (r) green (g) and blue (b) pixel content expressed as (r, g, b). When provided in 3D form, the r,g,b content is modified by a function f for each color content. That is, a function f operating on the red pixels modifies the red pixel content ($f_r(r)$), a function operating on the green pixels modifies the green pixel content ($f_g(g)$), and a function operating on the blue pixels modifies the blue pixel content ($f_b(b)$). This function f is in effect the result of the response of the 3D display device being used. Thus, the 3D version content 110 of the (r,g,b) content, as displayed on a 3D display at 110 may be expressed as ($f_r(r)$), ($f_g(g)$), ($f_b(b)$). The addition of 3D glasses 115 can further modify the r,g,b content by applying a function g that operates on the output of the 3D display unit 110. Thus, the end user sees the interpreted 3D display 120 through the 3D glasses 115 as ($g_r f_r(r)$, $g_g f_g(g)$, $g_b f_b(b)$). More specifically, all 3D glasses currently on the market provide color shifting because of their lens arrangement. 3D glasses can thus distort the desired color originally intended from the content 105. This color distortion provided by the 3D glasses is undesirable in practical everyday consumer use. For example, some shutter glasses have a green tint which makes the whole picture appear greenish in color. Other shutter 3D glasses have a yellow tint which makes the whole picture appear to be yellowish in color.

Figure 2:
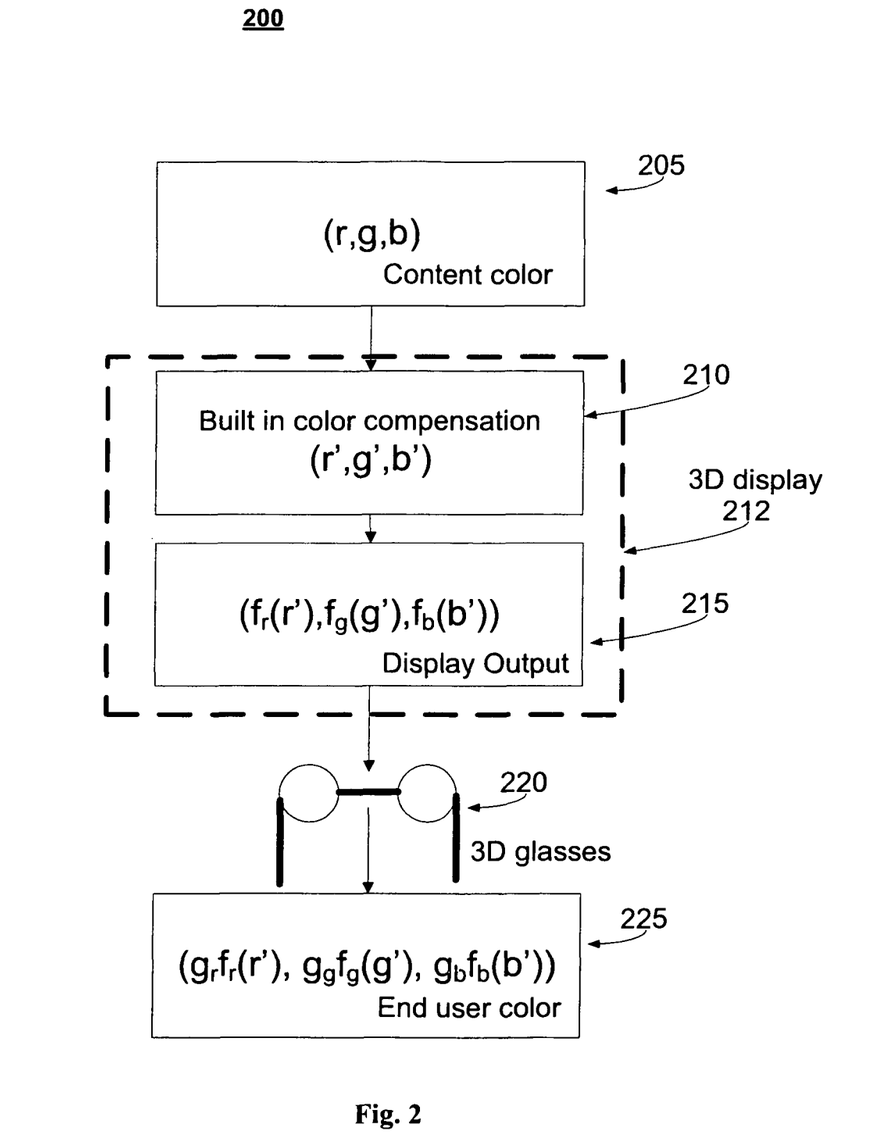
FIG. 2 illustrates an example of color distortion in a prior art 3D and 2D system with built in color compensation.

Another common problem for 3D displays or 3D TVs is that the color distortion for the same content between their 2D and 3D mode changes, as shown in FIG. 2. Many 3D displays or 3D TVs have some kind of color compensation built in for 3D mode. But, when 3D glasses are worn in 2D mode, the inherent tint of the 3D glasses tints the entire picture for the user.

FIG. 2 illustrates color distortion in another system operating in a 3D mode. The 3D display 212 depicted in FIG. 2 may have built-in color compensation that operates differently than the present invention. The system 200 of FIG. 2 illustrates a post production pixel color content 205 of r,g,b. The 3D display can modify this color content via color compensation to be r',g',b' as in 210. This can cause red, green, and blue function modifications 215 of the color compensated signal 210 resulting in ($f_r(r')$, $f_g(g')$, $f_b(b')$). The 3D glasses worn by a user changes color functions resulting in ($g_r f_r(r')$, $g_g f_g(g')$, $g_b f_b(b')$) as in 225. However, the color compensation in block 210 may be fixed such that over time, as elements of the 3D display 212 age, the r',g',b' characteristics change resulting in age-related color distortions. This can cause color differences to appear as the user views 3D content using 3D glasses and even 2D content without using glasses. Currently, color re-calibration is not available to users for age-related color shifting.

SUMMARY

This invention relates to color calibration of 3D display systems that use 3D glasses worn by a user. Typical 3D glasses may include shutter/polarized glasses. Embodiments of the invention include a method to compensate the color shifting that is caused by glasses in a 3D display system. The color shifting is modeled as different, gains applied to RGB channels. A calibration method is used to estimate the gains (color intensity) of each color channel, and a correction method is applied to compensate such color shifting. Since the calibration process does not require professional photometer equipments, it can be easily implemented and integrated in consumer devices.

In one embodiment, a method performed by an apparatus for color correction of a 3D display device includes generating a pixel of a grey color having three pixel color channels. The grey color has channels that are substantially equal color intensity values. The grey color is displayed on a display screen. A user or other input source provides an adjusted color intensity values for two color channels of the pixel color channels of the grey color. A corrected color intensity value for the two color channels is calculated using the adjusted color intensity values and the color intensity values of the original grey color. Multiplicities of different colors of grey are provided to the display for adjustment by the user. Look up tables are generated that can be used to convert the original grey pixel color intensity values to the corrected color intensity values of the grey color.

The look-up tables can then be used to convert, pixel by pixel, color intensity values for all pixels in an input frame to construct a corrected frame of pixels. The converted frame represents a pre-distorted input so that a user, viewing a display of the corrected pixel frames, can perceive the displayed image as intended by the original input signal.

Additional features and advantages of the invention will be made apparent from the following detailed description of illustrative embodiments which proceeds with reference to the accompanying figures.

DETAILED DISCUSSION OF THE EMBODIMENTS

The color Muffing introduced by 3D glasses may be modeled as gain factors applied on three different color channels. Let the color observed without glasses be [r, g, b] in the display's device-dependent color space. Then the linear color intensity from the 3D display can be written as:

$$[f_r(r), f_g(g), f_b(b)] \quad (1)$$

where $f_r(r)$, $f_g(g)$, $f_b(b)$ are the response curves of the display for red, green, and blue channel respectively. This is as described in functional block 110 of FIG. 1. The effect of 3D glasses can be seen as a fixed gain factor applied to the linear color intensity of the three channels, described as below:

$$[g_r f_r(r), g_g f_g(g), g_b f_b(b)] \quad (2)$$

where $g_r$, $g_g$, $g_b$ are the scaling factor representing the effect from the glasses. This is as described in functional block 120 of FIG. 1.

The linear color intensity in (2) is different from the linear intensity in (1) as the three gain factors are usually not equal to each other. This models the color distortion introduced by the 3D glasses in a 3D display system.

The goal of color compensation is to find another color [r', g',b'] such that $$[g_r f_r(r'), g_g f_g(g'), g_b f_b(b')] = C[f_r(r), f_g(g), f_b(b)] \quad (3)$$

Here, the scaling factor C is either 1 or some other constant. This means that after color compensation, the displayed color is the same as the desired color (C=1), or the displayed color is constantly brighter or darker (C~=1). The compensation for brightness difference can be controlled via adjustment of backlighting, which is available in many modern LCD TVs. Here the focus is on maintaining the same color for an end user regardless if viewed through 3D glasses or not.

As mentioned above, the goal is to find a color value [r', g', b'] that satisfies equation (3). To simplify the problem, we let $$g'=g \quad (4)$$

In one embodiment, one need only adjust red and blue components; leaving the green component unadjusted. From equation (3), one can assert that $$C=g_g \quad (5)$$

Considering that red and blue components are quite similar in the following deduction, then r' can be obtained as below and b' can be obtained in similar fashion.

Substituting (5) into (3) the following equation results:

$$f_r(r') = \frac{g_g}{g_r} f_r(r) \quad (6)$$

By calculating the logarithm of both side of equation (6) then:

$$\ln(f_r(r')) = \ln\left(\frac{g_g}{g_r}\right) + \ln(f_r(r)) \quad (7)$$

To simplify the notion, let $$F(x) = \ln(f_r(x)), \; C' = \ln\left(\frac{g_g}{g_r}\right) \quad (8)$$

Then equation (7) can be rewritten in a simple form as follows:

$$F(r')=F(r)+C' \quad (9)$$

or $$r'=F^{-1}(F(r)+C') \quad (10)$$

Equation (10) is a closed-form solution useful to derive the compensated color. However, equation (10) cannot be used directly because it contains several unknown factors. The unknown factors include the response curve of the display device, and $g_r$, $g_g$, $g_b$, characterized by the spectrum response of the glasses, which are both usually unavailable to a user.

Normally, to help determine the unknown factors, special equipment such as photometers and associated calibration equipment is needed. But, these are not widely available or easy to use for common end users. According to aspects of the invention, the following technique is used for calibration of a 3D display that includes the use of 3D glasses.

Initially, a grey color pixel sample with a color intensity value of $r_1,g_1,b_1$, where each color channel in the picture has the same color intensity value. Thus, $r_1=g_1=b_1$ is displayed as a plurality of same colored pixels to end user on a display. A grey color is the normal result of the combination of r, g, and b where the intensity of the r, g, and b pixel color intensity values are substantially equal in a pixel. Different tones or shades of grey result when the intensity of the r,g,b channels are changed. A plurality of grey pixels can result in a grey display portion of a display device. Generally, the plurality of grey color pixels are presented to the end user may be shown on the entire display screen or just a portion of the display screen. Because of color shifting occurring in both the 3D display device and the 3D glasses, the grey color may not appear to the user as uniformly or completely grey in color. Then, while wearing the 3D glasses, end user adjusts the red and blue channels such that after adjustment, the colors perceived by the user wearing the 3D glasses are closest to the grey color. Note that the green channel is held constant. In practice, any one of the three channels may be held constant as long as the other two are adjustable by the user. After adjustment, the user-adjusted color intensity values for the grey level are recorded as $[r_1'', g_1, b_1'']$. These user-adjusted color intensity values are associated with the original colors of $[r_1,g_1,b_1]$ Next, a different shade of grey is presented to the user on the display where, $r_2=g_2=b_2$ represents a second shade of gray color. Once again, the user adjusts the red and blue color intensity values of the specific red and blue channels to generate a uniform shade of grey and the user-adjusted color intensity values are recorded as $[r_2{}^u, g_2, b_2{}^u]$ which correspond to the input of $[r_2,g_2,b_2]$. This step of presenting another new grey shade to the user and recording the user-adjusted color intensity values is repeated for at least N times where N≥3.

After the above process is done, a group of input color value set $[r_i, g_i, b_i]$ $[r_i,g_i,b_i]$ and their corresponding user-adjusted color intensity values $[r_i{}^u, g_i, b_i{}^u]$ provided by the user. As human beings are good at identifying grey colors versus non-grey ones, the above process can be done with a reasonably high quality of results for the user. The next step is to derive the unknown parameters in equation (10).

As the function F(x) in equation (10) is usually a smooth function, equation (10) can be modeled as a polynomial function. As an example, a second order polynomial function is given below:

$$F(x)=a_1x^2+a_2x+a_3 \quad (11)$$

From the user-assisted calibration process, we have a group of color pairs (i.e. $[r_i, g_i, b_i]$ and $[r_i{}^u, g_i, b_i{}^u]$) that satisfy equation (9). Substituting (11) into (9) the following equations result:

$$a_1r_i{}^{u2}+a_2r_i{}^u+a_3=a_1r_i{}^2+a_2r_i{}^2+a_2r_i+a_3+C^u \quad (12)$$

By rearranging the terms:

$$a_1(r_i{}^{u2}-r_i{}^2)+a_2(r_i{}^u-r_i)-C^u=0 \quad (13)$$

Since there are N (N≥3) color pairs, equation (13) forms an over-constrained linear equation system that can be solved efficiently with pseudo inverse or other regression methods. Note that from linear equations established based on (13), one cannot obtain the value for $a_3$. However, as shown below, $a_3$ can be ignored.

Introducing function G(x):

$$G(x)=F(x)-a_3=a_1x^2+a_2x \quad (14)$$

Equation (9) can also be written as:

$$G(r')=G(r)+C' \quad (15)$$

Thus:

$$r'=G^{-1}(G(r)+C') \quad (16)$$

Where r' is the red correction or predistortion color intensity value for input color r. Stated another way, r' is the predistortion color intensity value for an input r. In a 3D system, the value r' can be substituted for the value of r that is intended to be displayed. By using the predistorted displayed value of r' instead of the desired value of r, the end user, wearing 3D glasses, will see a color corresponding to the original desired color of r.

As all parameters in equation (16) are known, it can be used to compute the corrected red component. A closed-form solution to compensate colors for blue component is derived in the same fashion producing:

$$b'=G^{-1}(G(b)+C') \quad (17)$$

For practical applications, once we obtain all parameters in equation (16), a look-up table having color intensity values for the red channel and the blue channel can be generated and stored in the memory for fast access. If the precision for the red channel is 8 bit, the look-up table for the red channel has 256 entries. The same is true for the blue channel.

An example of a portion of a look up table for the red channel Tr would be as follows:

| Original Red Input | Corrected Red Output |
|---|---|
| $r_1$ | $r'_1$ |
| $r_2$ | $r'_2$ |
| $r_3$ | $r'_3$ |
| $r_4$ | $r'_4$ |

A blue look up table Tb would be similarly constructed.

Figure 3:
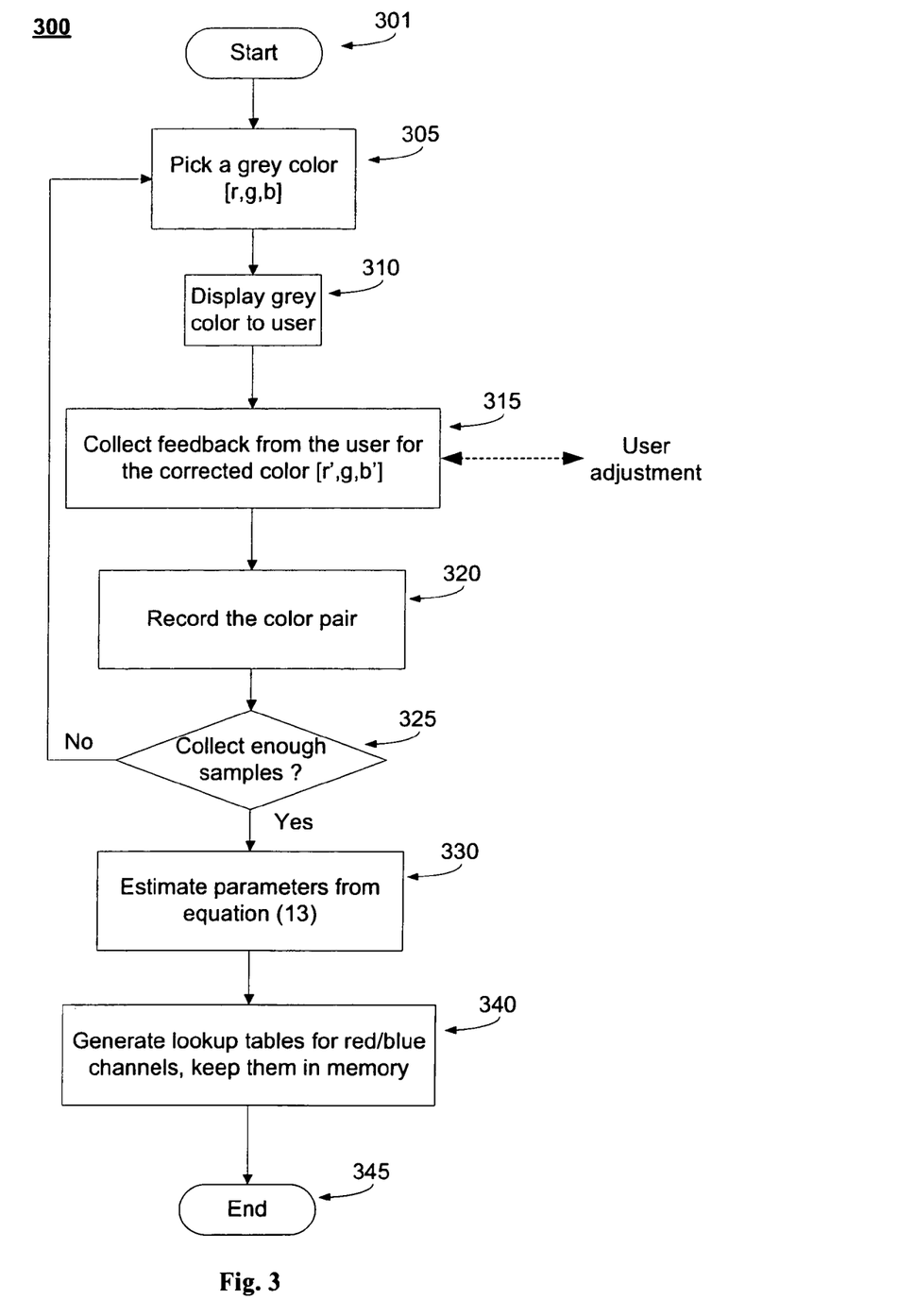
FIG. 3 illustrates an example calibration method to generate look-up tables for color compensation using aspects of the invention.

FIG. 3 depicts an example flowchart for a color compensation process 300. The process 300 can start at step 301 when an event occurs that requires a color calibration of a 3D system. Such an event can be triggered by power up of the 3D system, a user request, a detection of a 3D different component, such as a different display or glasses, and the like. A grey color or level is selected. This may be performed by the TV or Set Top Box (STB), or any other device in the 3D system. At step 310, the color is displayed to the user on a 3D display where color intensity values are equal, that is, r=g=b. At this point, feedback is collected from a user wherein the user adjusts two of the three colors. In one embodiment, red and blue color components of a grey screen pixel display are adjusted by the user wearing 3D glasses while the third color is held constant. The objective is for the user to adjust the two color channels to make the overall picture appear as grey to the user as possible. The user may accomplish this by using TV, STB, or other equipment controls, such as a remote control, to adjust each of the two color intensity values individually to obtain a grey display color suitable to the user.

After the user adjustment, the adjusted color intensity value of each of the two colors is recorded at step 320 as a color pair related to the constant third color. The number of adjusted color samples is tested at step 325 to determine if enough colors are sampled. In one embodiment, at least three different grey colors are displayed and corrected color pairs are recorded. If enough colors are not yet sampled, (i.e. N<3) then step 325 moves to step 305 where a different gray color is selected for presentation to the user. If enough samples are taken at step 325, then step 330 is invoked to estimate the parameters (i.e. coefficients $a_1$ and $a_2$, and C') of equation 13 using the adjusted two color components. A CPU or other computing device within the TV, STB, or other equipment is employed to perform the coefficient determination. With the parameters of equation 13 determined, then values for the lookup tables for two color channels, such as red and blue channel color intensity values, can be generated in step 340 using equations 16 and 17. These tables can be placed into memory for subsequent fast lookup of corrected color intensity values for a given input or desired color intensity value. This completes 345 the color calibration procedure 300.

Figure 4:
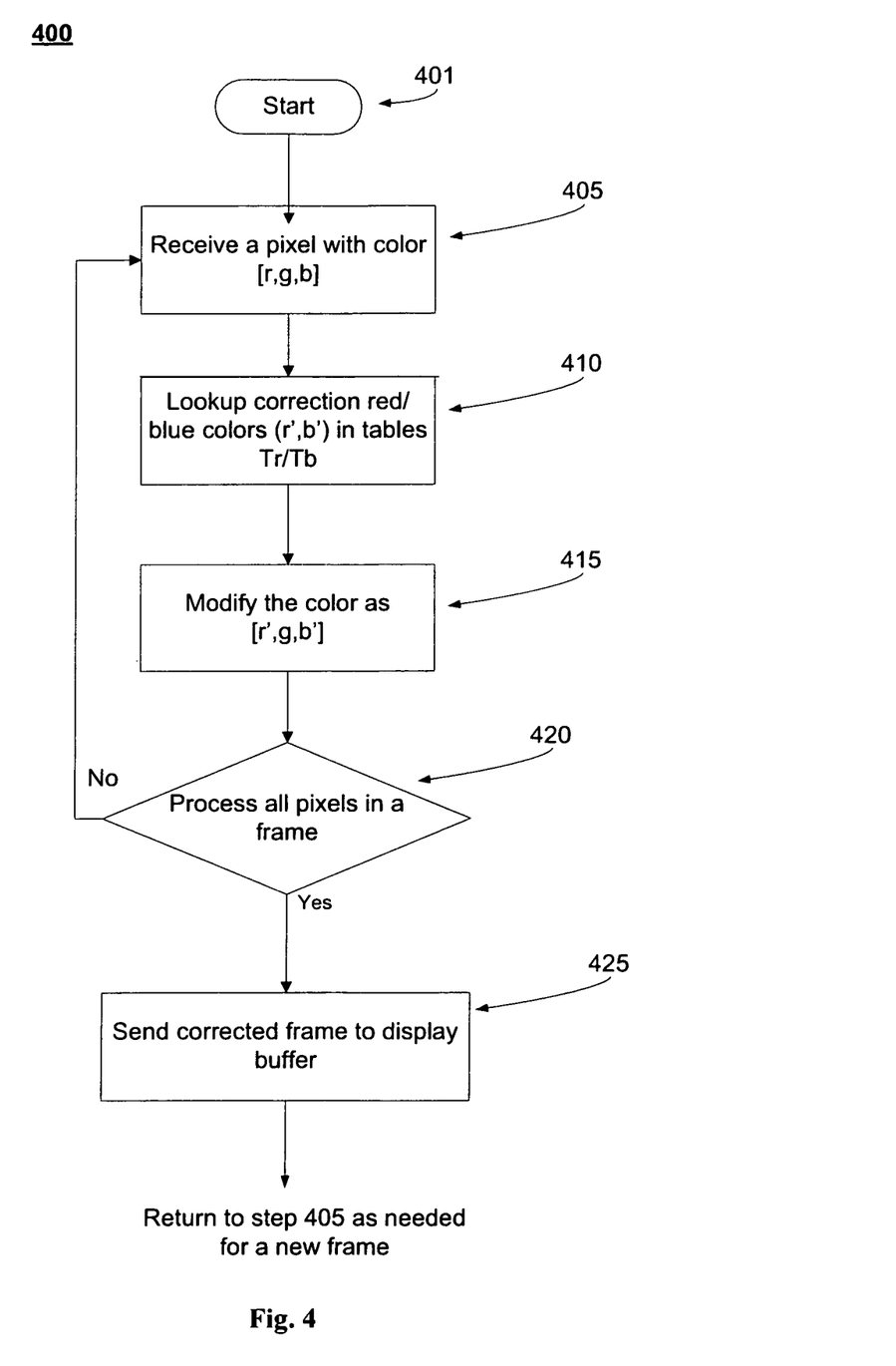
FIG. 4 illustrates an example of color compensation using aspects of the invention.

FIG. 4 depicts an example procedure 400 for color compensation within a 3D system. The process 400 can commence 401 anytime a pixel is intended to be displayed on a color 3D display system for which a color calibration is available. At step 405 a pixel having a red green and blue color channel is received by a color compensation device. A color compensation device may be a TV or a STB or any other equipment that can pre-distort pixels color channels for display on a 3D display. The received pixel represents an intended pixel color to be perceived by the user. At step 410, the lookup tables, such as Tr and Tb are referenced to obtain the corrected color intensity values of color channels for the red and blue pixels. For example, the lookup table Tr is used to read a corrected color intensity value $r_1'$ for an intended red pixel red color intensity value $r_1$. Similarly, the lookup table Tb is used to read a corrected blue color intensity value $b_1'$ for an intended blue pixel color intensity value $b_1$. At step 415, a substitution is made replacing the intended color with the corrected color in order to pre-distort an intended pixel having color channels. For example, the pixel $r_1 g_1 b_1$ is replaced with $r_1' g_1 b_1'$ color intensity values. Step 420 tests to ensure that all pixels in a frame have been color corrected. If a pixel in a frame is not color corrected via substitution from a lookup table, then the process moves from step 420 to step 405 to receive and process the next pixel in the frame. When all pixels within a frame are color corrected, then the color corrected frame can be sent to the display buffer in step 425 for display. Process 400 is then repeated for a next frame of display information.

Possible variations of the invention described herein include modifying equation (11) to include a higher order polynomial, or using other functions to model the function of equation (10). In the calibration process of FIG. 3, the user may be asked to adjust the color on the display by selecting one of a plurality of pre-adjusted results wherein the user would be asked to select one of the preselected color adjustments.

In one aspect of the invention, the calibration and compensation processes described in FIGS. 3 and 4 may be duplicated for a 2D image as well as a 3D image. Obtaining color correction for a 2D image is useful when the user is wearing 3D glasses while viewing a 3D program where there is occasional 2D content. Such a situation may arise when a main entertainment program is broadcast in 3D, but the intervening commercials or station breaks are broadcast in 2D. Other situations that may be encountered where 3D or 2D images may be interposed with one another are those that involve program changes or channel selection changes. In these situations, it would be inconvenient for the user to remove his 3D glasses to view the occasional 2D content with proper color correction.

Thus, using aspects of the invention, a color calibration can be performed for a 2D image color correction and a 3D color calibration can be performed for a 3D image color correction. The TV, STB, or other equipment could sense when that broadcaster is sending 3D images and thus use the look-up tables for the 3D color correction during 3D image display. Likewise when the broadcast changed from 3D to 2D, the TV or STB or other equipment could utilize lookup tables for the 2D color correction during a 2D image broadcast. Naturally, subsequent detection of a 3D broadcast would switch the lookup tables used to the 3D tables for proper color correction of the 3D image program. Thus, the user would not have to remove his 3D glasses for proper color correction in instances where both 3D and 2D images were being presented.

Figure 5:
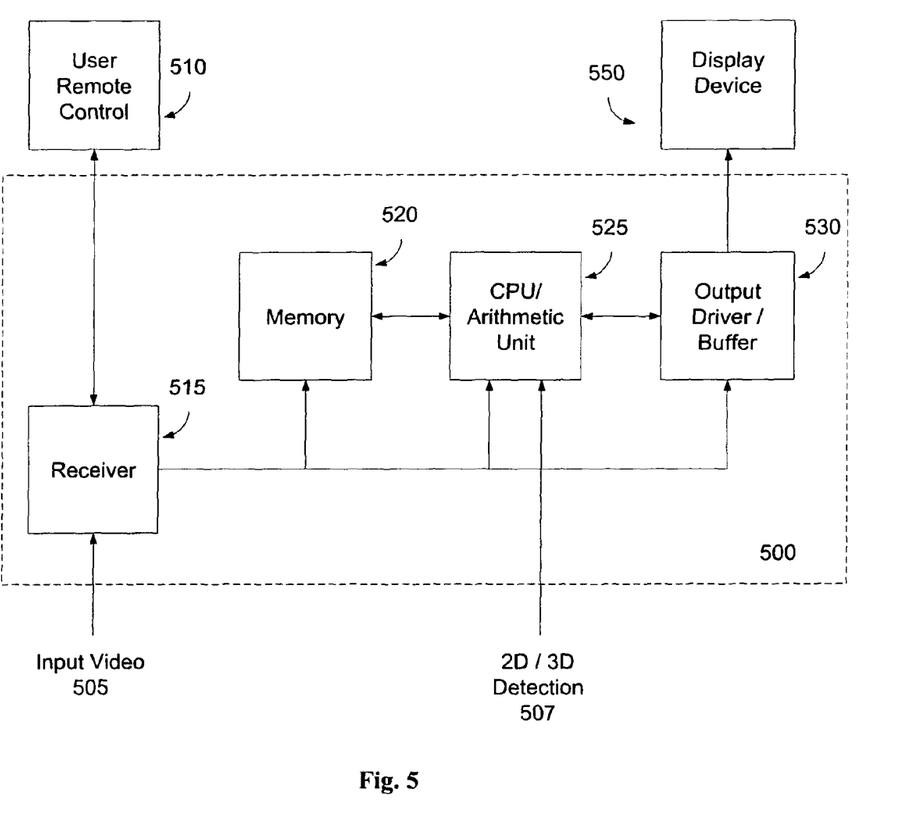
FIG. 5 illustrates an example apparatus for calibration and compensation using aspects of the invention.

FIG. 5 depicts a device 500 useful to receive input video information and perform calibration and compensation according to aspects of the present invention. Device 500 may be part of a TV, a STB, or other equipment in a 3D display system.

Input video 505 is received by the device 500 and provides pixel information that may be stored in memory 520. CPU-Arithmetic unit 525 may serve as a controller and/or processing unit that performs the calibration method described herein, such as described with respect to FIG. 3. In the calibration method, the user remote control 510 is useful as an interface to allow the user to adjust pixel color as needed by the calibration process of FIG. 3. During that process, memory 520 may be used to store look-up table values. The CPU 525 uses output driver 530, such as a frame buffer, to drive a display device 550 as needed for the user calibration process.

The device 500 may be used in the color correction mode by utilizing the look-up table information stored in memory 520 to correct incoming video pixels, frame by frame, into color corrected or pre-distorted pixels to be displayed. The CPU or equivalent video controller can accept the incoming pixels from the receiver 515, convert the pixels into color corrected pixels using look up tables in the memory 520, and populate a frame buffer in the output driver 530 for eventual display on display 550. According to another aspect of the invention, a 2D/3D detection control 507 could be used by the CPU 525 or equivalent video controller to determine whether to use the 3D look up tables for a detected 3D input video signal or to use the 2D look up tables for a detected 2D input video signal.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

The invention claimed is:

1. A method performed by an apparatus for color correction of a three dimensional display device, the method comprising:

(a) generating a pixel of a grey color having three separate pixel color channels having substantially equal color intensity values for each of the pixel color channels;

(b) displaying a plurality of the pixel on the display device;

(c) receiving adjusted color intensity values for only two of the three separate pixel color channels, wherein the adjusted color intensity values are based on a user perceiving the pixel as being closest to a perceived grey color, without using a photometer, and wherein other one of the three separate pixel color channels is unadjusted;

(d) calculating corrected color intensity values for the pixel color channels using the adjusted color intensity values and the pixel color intensity values;

(e) generating look-up tables to convert the pixel color intensity values to the corrected color intensity values; and (f) performing (a) through (e) repetitively three or more times (N≥3) for three or more different colors of grey.

2. The method of claim 1, wherein the only two of the three separate pixel color channels are red and blue.

3. The method of claim 1, wherein a pixel of a grey color is used by the apparatus for display of a three dimensional color image.

4. The method of claim 1, wherein a pixel of a grey color is used by the apparatus for display of a two dimensional color image.

5. The method of claim 1, further comprising:

(g) converting a frame of input pixels to a color corrected frame of pixels using the lookup tables; and (h) displaying the color corrected frame on the display device.

6. The method of claim 5, wherein the frame of input pixels are at least one of the group consisting of a frame of three dimensional input pixels and a frame of two dimensional input pixels.

7. The method of claim 1, wherein the receiving (c) comprises receiving adjusted color intensity values from a user viewing the display through three dimensional glasses.

8. The method of claim 6, wherein the user views the display device through three dimensional glasses.

9. An apparatus for color correction of a three dimensional display device, the apparatus comprising:

the display device presenting a pixel having input color intensity values to a user;

a receiver to accept adjusted color values for only two of three separate pixel color channels from a user viewing the display device, wherein the adjusted color intensity values are based on the user perceiving the pixel as being closest to a perceived grey color, without using a photometer, and wherein other one of the three separate pixel color channels is unadjusted;

a processor to calculate corrected color intensity values using the adjusted color intensity values, and to generate look up tables for conversion of input color intensity values to corrected color intensity values, wherein video data having input color intensity values is subsequently displayed to a user as corrected color intensity values via use of the lookup tables; and wherein the display device presents the input color intensity values of three or more (N≥3) colors of grey to the user.

10. The apparatus of claim 9, wherein the input color intensity values are three dimensional color intensity values.

11. The apparatus of claim 10, wherein the display device presents a three dimensional color corrected frame of video data to be viewed by the user wearing three dimensional glasses.

12. The apparatus of claim 9, wherein the input color intensity values are two dimensional color intensity values.

13. The apparatus of claim 12, wherein the display device presents a two dimensional color corrected frame of video data to be viewed by the user wearing three dimensional glasses.

14. The apparatus of claim 9, wherein the only two of the three separate pixel color channels are red and blue.

* * * * *